United States Patent [19]

Albizzati et al.

[11] 4,401,641

[45] Aug. 30, 1983

[54] PROCESS FOR PREPARING CATALYST CARRIER OF MAGNESIUM CHLORIDE

[75] Inventors: Enrico Albizzati, Arona; Ivano Bassi, Cologno Monzese; Giorgio Foschini, Ferrara; Sandro Parodi, Oleggio; Franco Pirinoli, Milan, all of Italy

[73] Assignee: Montedison S.p.A., Milan, Italy

[21] Appl. No.: 335,154

[22] Filed: Dec. 28, 1981

Related U.S. Application Data

[63] Continuation of Ser. No. 180,478, Aug. 22, 1980, abandoned, which is a continuation of Ser. No. 940,115, Sep. 6, 1978, abandoned, which is a continuation of Ser. No. 763,672, Jan. 28, 1977, abandoned.

[30] Foreign Application Priority Data

Jan. 30, 1976 [IT] Italy ............................. 19749 A/76

[51] Int. Cl.$^3$ .............................................. C01F 5/32
[52] U.S. Cl. ............................... 423/498; 252/429 R; 526/185; 526/352; 526/351
[58] Field of Search ........................................ 423/498

[56] References Cited

FOREIGN PATENT DOCUMENTS 1387890 3/1975 United Kingdom ............ 252/429 B

OTHER PUBLICATIONS

Freeman et al., *J. Inorg. Nucl. Chem.*, 1958, vol. 7, pp. 224-227.
Hecht, H., Zeitschrift fur Anorganische Chemie Bd. 254, (1947), pp. 37-51.
Kristov et al., *Chemical Abstracts*, vol. 61, (1964), No. 9161c.
Weiss, *Chem. Ber.*, J. 98, (1965), pp. 2805-2813.
Kristov et al., *Godishnik Sofiskiya*, Univ. Khim. Fak., 55, (1960-1961), pp. 49-66.

*Primary Examiner*—Brian E. Hearn

[57] ABSTRACT

A new crystalline form (beta form) of $MgCl_2$ is disclosed, as are methods for obtaining it by reaction of $SOCl_2$ with hydrated $MgCl_2$ at a temperature comprised between room temperature and the boiling point of $SOCl_2$.

1 Claim, No Drawings

PROCESS FOR PREPARING CATALYST CARRIER OF MAGNESIUM CHLORIDE

This is a continuation of application Ser. No. 180,478, filed Aug. 22, 1980, now abandoned, which in turn is a continuation of Ser. No. 940,115, filed Sept. 6, 1978, now abandoned, which in turn is a continuation of Ser. No. 763,672, filed Jan. 28, 1977, now abandoned.

BACKGROUND OF THE INVENTION

It is known now, from patents originating with our group, that catalysts the starting components of which are (a) a hydride or organometallic compound of a metal belonging to Groups I to III of the Mendelyeev Periodic System, typically an alkyl Al compound, and (b) the product obtained by contacting a compound of a transition metal, typically $TiCl_4$ or $TiCl_3$, with a support or carrier which is $MgCl_2$ activated by special techniques, are used for the polymerization of olefins, e.g., ethylene, propylene or mixtures of propylene with minor amounts of ethylene, the yield of polymer obtained, in grams/gram of Ti used is much higher than the yield obtained using the catalysts without a support or with a conventional support different from the activated $MgCl_2$.

The known crystalline modification of $MgCl_2$ in the activated state is the α-form, characterized by having a stratified structure, cubical packing of the chlorine atoms, crystallization in the rhombohedric system, and by deformation (as a result of the activation) such that the reflection at d=2.56 A (which is the most intense diffraction line in its X-rays powder spectrum) decreases in intensity and is replaced by a diffused halo.

THE PRESENT INVENTION

An object of this invention is to provide a new crystalline form of $MgCl_2$ which, used as support or carrier in the catalysts referred to herein, is capable of remarkably boosting the yield of polymer in grams/gram of Ti (or other transition metal) used and without having to be subjected to the special activating techniques.

This and other objects which will be apparent are achieved by providing a new crystalline form (β-form) of $MgCl_2$ which, while having a stratified structure, crystallizes in the hexagonal system (spatial group $P_3$ ml, with Z being 1; constants of the elementary cell: a=b=3.641 Å; c=5.927 Å), and shows a hexagonal packing of the chlorine atoms.

The new crystalline modification of $MgCl_2$ of this invention can be obtained by the prolonged reaction of $SOCl_2$ with hydrated $MgCl_2$, in particular $MgCl_2.6H_2O$ or $MgCl_2.2H_2O$, at temperatures ranging from room temperature to the boiling point of $SOCl_2$.

The relevant characterstics of the X-rays powder spectrum of the new crystalline form of the $MgCl_2$ of the invention are given in the Table below.

In addition to listing the observed distances ($d_{obs}$), the Table also records the calculated distances ($d_{calc}$), on the basis of the elementary cell as described above. The intensities of the observed reflections (I obs). may show fluctuations in consequence of the more or less accentuated degree of disorder in the sample X-rayed.

The new crystalline form of $MgCl_2$ of the invention is particularly adapted to use in the preparation of catalysts for the polymerization of olefins, e.g., ethylene, propylene, or mixtures thereof, to high yields, and the starting components of which are (a) hydrides or organometallic compounds of a metal belonging to Groups I to III of the Mendelyeev Periodic System, specifically an alkyl Al compound as, for instance, an Al-trialkyl or an Al-alkyl halide, and (b) the product obtained by contacting a compound of a transition metal, specifically a halogenated Ti compound, with the present new and different crystalline modification of $MgCl_2$.

When the olefin to be polymerized is propylene, or a mixture thereof with ethylene, the presently preferred catalyst is one the starting components of which are, in addition to an alkyl Al compound and a halogen-containing Ti compound, an electron-donor compound in particular an alkyl ester of an aromatic acid.

The starting components of the catalysts in which the support, or carrier is the new crystalline form of $MgCl_2$ are, in a presently preferred embodiment, as follows:

(a) an alkyl Al compound, in particular an Al-trialkyl such as triethyl Al, tripropyl Al, and tributyl Al, pretreated with an electron-donor compound in an amount of less than 1.0 mol/mol of the trialkyl Al, and preferably in an amount of from 0.2 to 0.4 mol/mol of the trialkyl Al; and (b) the product obtained by contacting a halogenated Ti compound with the particular crystalline modification of $MgCl_2$ of this invention, in the presence of from 0.05 to 1.0 mol of an electron-donor compound per mol of the $MgCl_2$.

Any electron-donor compound can be used in preparing components (a) and (b) of the catalysts.

The polymerization of olefins with the catalysts in which starting component (b) is the product obtained by contacting a halogenated Ti compound with the new crystalline form of $MgCl_2$ is carried out in the presence of, or in the absence of, an inert liquid diluent, or in the gas phase.

The following examples are given to illustrate the invention in more detail and are not intended to be limiting.

EXAMPLE 1

20 g of $MgCl_2.6H_2O$ were treated with 100 ml of $SOCl_2$. Operating within the temperature range comprised between 25° and 60° C. for 40 hours, there was obtained $MgCl_2.2H_2O$. This latter product was then treated for 32 hours with a further quantity of boiling $SOCl_2$, thus obtaining a white crystalline solid practically free of $H_2O$, the composition of which corresponded to that of $MgCl_2$ and the crystallographic structure of which, on X-rays analysis, corresponded to that described hereinabove.

1.6 g of the solid so obtained were treated at 25° C. with a solution of 1 mMol of $TiCl_4$ in 15 ml of n-heptane for 90 minutes under stirring. The solvent was then evaporated to dryness, thereby isolating a solid which, on analysis, was found to have a titanium content of 0.72%.

The crystallographic structure of the $MgCl_2$ remained unaltered after the treatment with $TiCl_4$.

90 mg of the catalytic component prepared as indicated above and 1000 ml of anhydrous, deaerated and desulphurized n-heptane were introduced, together with 2 ml of $Al(i-C_4H_9)_3$, under a nitrogen atmosphere, into a stainless steel autoclave of 3 liter holding capacity, fitted with an anchor stirrer and heated to 85° C. Thereupon, there were added 4 atm. of hydrogen and 9 atm. of ethylene, keeping the total pressure constant throughout the polymerization by continuously feeding in ethylene. After 4 hours of reaction, the polymerization was stopped, the reaction mixture was filtered and the polymer was dried, thereby obtaining 360 g of product.

The yield of polyethylene was 555,000 gms/g Ti. The inherent viscosity of the polyethylene, measured in tetrahydronaphthalene at 138° C., using concentrations of 0.25 g polymer/100 ml of solvent, was 2.12 dl/g.

EXAMPLE 2

95 mg of the catalytic component prepared as indicated in Example 1, from $TiCl_4$ and the new crystalline modification of $MgCl_2$, were suspended in a solution obtained by reacting, in 50 ml of n-heptane, 5.75 mMole of $Al(C_2H_5)_3$ and 1.83 mMols of ethyl p-anisate for 10 minutes.

Said catalytic suspension was diluted to 700 ml with n-heptane and then introduced under a nitrogen atmosphere into a stainless steel autoclave of 3000 ml holding capacity, fitting with an anchor stirrer and heated to 60° C.

Thereupon, 0.1 atm. of hydrogen and 5 atm. of propylene were added, keeping the total pressure constant throughout the polymerization by continuously feeding in propylene. After 3 hours of reaction, the polymerization was stopped; from the suspension, obtained after treatment with a mixture of acetone and methanol, 18 g of polypropylene were isolated (yield=26,000 g polypropylene/g Ti), which showed an inherent viscosity of 1.25 dl/g. The residue of the extraction with boiling n-heptane was 80%.

EXAMPLE 3

1.2 g of $MgCl_2$, obtained as in Example 1, were treated at 80° C. with 40 ml of $TiCl_4$ under stirring for 60 minutes. The mixture was then filtered and washed at the same temperature with n-heptane. The solid obtained was dried and on analysis it showed a titanium content of 0.95%. The crystallographic structure of the $MgCl_2$ remained unaltered after this treatment.

64 mg of the catalytic compound prepared as above were used for polymerizing ethylene according to the procedure described in Example 1. 80 g of polyethylene (with a yield of 131,000 g polyethylene/g Ti) were obtained and found to have an inherent viscosity of 2.52 dl/g.

EXAMPLE 4

4 g of $MgCl_2$ obtained as in Example 1 were treated at 80° C. with a sodium containing 0.334 g of $TiCl_4.C_6H_5COOC_2H_5$ in 17 ml of benzene. This reaction mass was kept under stirring at the same temperature for 90 minutes. The solvent was evaporated to dryness, thus isolating a solid, which on analysis had a titanium content of 0.85%.

The crystallographic structure of the $MgCl_2$ remained unaltered after this treatment.

Propylene was then polymerized, using as component (b) of the catalyst 195 mg of the product thus prepared.

There were obtained 20 g of polypropylene (with a yield of 12,000 g polypropylene/g Ti); the residue (isotactic polypropylene) after extraction of the crude or total polypropylene with boiling n-heptane was 85%.

EXAMPLE 5

2.8 g of $MgCl_2$, prepared as in Example 1, were reacted with a solution containing 3.68 mMoles of ethyl benzoate in 20 ml of n-heptane, at 25° C. for 16 hours. The solvent was then evaporated under vacuum, thereby isolating a white solid which was reacted with 60 ml of $TiCl_4$ at 80° C. for 2 hours. This mass was then filtered at 80° C., the solid obtained was washed with n-heptane and, on analysis, was found to have a titanium content of 0.50%.

The product thus obtained showed that the initial crystallographic structure of the $MgCl_2$ remained unaltered.

93 mg of the catalytic component prepared as indicated above were suspended in a solution containing 0.3 mMols of methyl p-toluate and 0.96 mMols of $Al(i-C_4H_9)_3$ in 50 ml of n-hexane, and this suspension was introduced, in a propylene current, into a 1,000 ml stainless steel autoclave fitted with an anchor stirrer, heated to 45° C. and containing a solution of 4.04 mMols of $Al(i-C_4H_9)_3$ and 1.3 mMols of methyl p-toluate in 450 ml of n-hexane.

$H_2$ was then added to reach a partial pressure of 0.1 atm. and then propylene up to a total pressure of 5 atm; at the same time the temperature was raised to 60° C. The total pressure was maintained constant throughout the polymerization by continuously feeding in propylene.

After 5 hours the polymerization was stopped and, by precipitation with acetone and methanol, there were isolated 15 g of propylene (with a yield of 32,000 q polypropylene/g Ti) having a residue after extraction with boiling n-heptane of 92.4% and an inherent viscosity of 2.05 dl/g.

TABLE

| hkl | $d_{calc.}$ (Å) | $d_{obs.}$ (Å) | $I_{obs.}(*)$ |
|---|---|---|---|
| 001 | 5.93 | 5.90 | f |
| 100 | 3.15 | 3.10 | dd |
| 002 | 2.96 | 2.94 | md |
| 101 | 2.78 | 2.77 | ff |
| 102 | 2.159 | 2.144 | md |
| 003 | 1.976 | 1.973 | ddd |
| 110 | 1.821 | 1.814 | f |
| 111 | 1.740 | 1.734 | dd |
| 103 | 1.674 | 1.665 | ddd |
| 200 | 1.577 | — | — |
| 112 | 1.551 | 1.544 | dd |
| 201 | 1.524 | 1.517 | dd |
| 004 | 1.482 | 1.481 | ddd |
| 202 | 1.392 | 1.387 | ddd |
| 104 | 1.341 | — | — |
| 113 | 1.339 | 1.334 | ddd |
| 203 | 1.232 | 1.228 | ddd |
| 210 | 1.192 | — | — |
| 005 | 1.185 | — | — |
| 211 | 1.168 | 1.165 | dd |
| 114 | 1.149 | 1.145 | dd |
| 105 | 1.109 | } 1.108 | ddd |
| 212 | 1.106 | | |
| 204 | 1.079 | — | — |
| 300 | 1.051 | 1.050 | dd |
| 301 | 1.035 | 1.034 | ddd |
| 213 | 1.021 | 1.019 | ddd |
| 115 | 0.993 | } 0.989 | dd |
| 302 | 0.991 | | |
| 006 | 0.988 | | |
| 205 | 0.947 | — | — |
| 106 | 0.943 | — | — |
| 214 | 0.929 | — | — |
| 303 | 0.928 | — | — |
| 220 | 0.910 | 0.909 | dd |
| 221 | 0.899 | 0.899 | ddd |

TABLE-continued

| hkl | $d_{calc.}$ (Å) | $d_{obs.}$ (Å) | $I_{obs.}$(*) |
|-----|-----|-----|-----|
| 310 | 0.875 | — | — |
| 222 | 0.870 | 0.870 | ddd |
| 116 | 0.868 | | |
| 311 | 0.865 | 0.864 | ddd |
| 304 | 0.857 | 0.856 | ddd |
| 007 | 0.847 | — | — |
| 215 | 0.840 | | |
| 312 | 0.839 | 0.839 | ddd |
| 206 | 0.837 | | |
| 223 | 0.827 | — | — |
| 107 | 0.818 | 0.815 | ddd |
| 313 | 0.799 | 0.798 | ddd |

(*) f = strong
m = medium
d = weak

What we claim is:

1. Process for preparing a carrier for catalysts for the polymerization of olefins and consisting of practically anhydrous magnesium chloride, which process comprises first treating hydrated magnesium chloride with thionyl chloride at a temperature between 25° C. and 60° C. and then treating the product thus obtained with boiling thionyl chloride to obtain a white crystalline solid practically free of $H_2O$, the composition of which corresponds to that of $MgCl_2$, and which shows an X-rays diffraction spectrum in which the reflection lines of maximum intensity appear at the following lattice distances:

d = 5.90 Å intensity f
d = 2.77 Å intensity ff
d = 1.814 Å intensity f.

* * * * *